N. DRAKE.

Corn Sheller.

No. 980.

Reissued June 12, 1860.

Witnesses:

Thomas Laurence

Jacob D Honkle.

Inventor:

N Drake

N. PETERS, Photo-Lithographer, Washington, D. C.

UNITED STATES PATENT OFFICE.

NATHANIEL DRAKE, OF NEWTON, NEW JERSEY.

IMPROVEMENT IN CORN-SHELLERS.

Specification forming part of Letters Patent No. 27,705, dated April 3, 1860; Reissue No. 980, dated June 12, 1860.

*To all whom it may concern:*

Be it known that I, NATHANIEL DRAKE, of Newton, in the county of Sussex and State of New Jersey, have invented certain new and useful Improvements in Corn-Shellers; and I do hereby declare that the following is a clear, full, and exact description of the same, reference being had to the accompanying drawings, making a part of this specification, in which—

Figure 1:
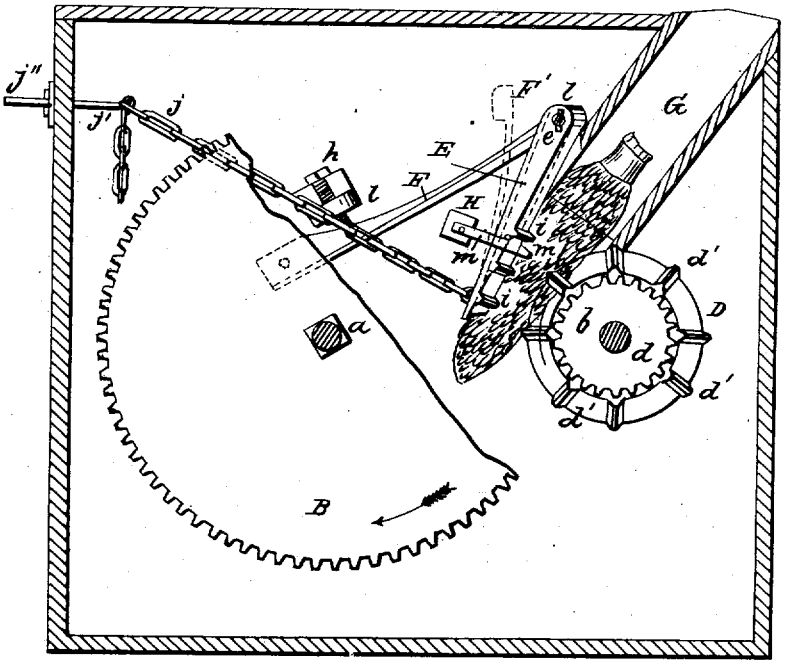
Figure 2:
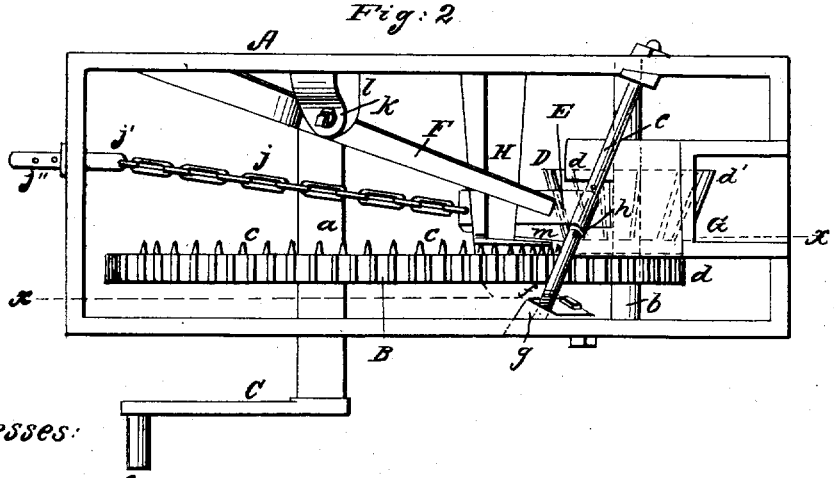

Figure 1 represents a vertical section of a corn-sheller with my improvements applied to it, *x x*, Fig. 2, showing the plane of section. Fig. 2 represents a plan or top view of the same with the cover removed.

Similar letters of reference indicate corresponding parts in the figures.

To enable those skilled in the art to fully understand and construct my invention, I will proceed to describe it.

A represents a rectangular box or case, in which two shafts, *a b*, are placed transversely. On the shaft *a*, and within the case A, a toothed wheel, B, is placed, said wheel having teeth on its periphery, and armed with horizontal teeth or spikes *c* on one side. One end of the shaft *a* projects through the side of the case A, and has a crank, C, on its end. (See Fig. 2.) The wheel B gears into a pinion, *d*, on the shaft *b*, and on this shaft *b* a wheel, D, is placed, said wheel having an inclined periphery provided with transverse ribs *d'*. The smaller side of the wheel D is toward the wheel B, or toward the plane of its rotation. In the upper part of the case A a shaft, *e*, is placed obliquely, said shaft having a screw, *f*, at one end, which screw fits in a nut, *g*, at one side of the case, as shown clearly in Fig. 2, to permit of any necessary longitudinal adjustment of said shaft. On this shaft *e* the pressure plate or bar E is hung or suspended, the shaft passing loosely through the upper end of said plate or bar, which is prevented from sliding laterally thereon by pins *h h*, as shown clearly in Fig. 2. This bar has transverse and concave ribs *i* formed on its inner surface and at the lower part, and to the lower part of the plate or bar a chain, *j*, is attached, as shown in the drawings, said chain acting in the capacity of limiting the approach of the plate toward the wheels B and D, as well as affording a ready and convenient means of releasing the ear of corn from pressure by the plate either to facilitate its entrance or passage between the wheels. The length of the chain *j* can be adjusted in several ways, two of which are shown in the drawings at *j' j''*.

F is a spring, the lower end of which is secured in the case A in any proper manner. The upper end of this spring bears on the upper part of plate or bar E, as shown clearly in both figures, while by a set-screw at *k*, or its equivalent, which passes through a nut, *l*, attached to the case A, the pressure of the spring F can be regulated at pleasure.

G is an inclined trough or spout, which is placed on the case A and in line with the space between the plate or bar E and wheels B and D. The plate or bar E works between guides *m m*, attached to a horizontal bar, H.

The operation is as follows: Motion is given the shaft *a* in any proper way, and the two wheels B D rotate in the direction indicated by the arrows. The ears of corn (shown in red) are fed down the spout G, and pass along the lower side of the plate or bar E, which keeps the ears of corn pressed against the wheels as they are operated on by the shelling-teeth, thus insuring the separation of the corn from the cob. The plate or bar E, in consequence of the spring F bearing against it, is allowed to yield or give to compensate for the various-sized ears; and it will be seen that the plate or bar E will yield or give under an equal pressure at all points of movement, owing to the manner in which the spring F is made to bear upon it, for when the plate or bar E is forced outward the upper end of the spring F approaches nearer the shaft *e* or fulcrum of the plate or bar E, and consequently the plate or bar has an increased leverage-power as it yields to the ears while being shelled. Thus it will be seen that the plate or bar E will bear with an equal or nearly equal pressure on the ears of corn at all points of its movement, and the machine may be driven with much less power than if the spring of the plate or bar E bore on the lower part of the plate or bar, as shown by the dotted lines F' in Fig. 1, since by the latter arrangement the resisting-power of the spring increases as the plate or bar E is forced outward, and much greater power is required to operate the machine than by my present arrangement.

I am aware that corn-shellers have been patented which employ the combination of the conical ribbed and toothed wheels with an oblique-arranged spring-pressure plate, (or spring and plate pointing in the same direction,) inclined spout or hopper, and a set-screw for adjusting the pressure of the spring upon the ears of corn. I therefore do not claim, broadly, such an arrangement and combination.

Having described my improved corn-sheller, what I claim as new, and desire to secure by Letters Patent, is—

1. The combination of a plate, E, which presses directly upon the ear while the corn is being shelled therefrom, with a spring, F, arranged and operating as and for the purposes set forth.

2. The combination of the adjustable guard-chain *j* with the plate E and spring F, whereby the plate is prevented from falling against the shelling-wheels, although free to adapt itself to different-sized ears, and whereby the plate E and spring F can be raised by an attendant while the machine is in operation, substantially as described.

3. The combination of the plate E and spring F with the wheels B and D, constructed and arranged to operate in relation to each other as and for the purposes set forth.

4. The combination of the adjustable shaft *e* with the plate E, substantially as set forth.

5. The arrangement and combination of the obliquely-acting adjustable spring F, set-screw *k*, plate E, and adjustable guard-chain *j*, as and for the purpose herein shown and described.

In witness whereof I have hereunto signed my name.

NATHANIEL DRAKE.

Witnesses:

THOS. LAURENCE,
JACOB D. KONKLE.